United States Patent [19]
Kraus et al.

[11] Patent Number: 6,062,010
[45] Date of Patent: May 16, 2000

[54] APPARATUS FOR TREATING PLANT MATERIAL

[75] Inventors: Timothy J. Kraus, Honey Brook; Peter P. Haldeman, Reinholds, both of Pa.; Kevin J. Shinners, Madison, Wis.

[73] Assignee: New Holland North America, Inc., New Holland, Pa.

[21] Appl. No.: 09/128,139

[22] Filed: Aug. 3, 1998

Related U.S. Application Data

[60] Provisional application No. 60/054,653, Aug. 4, 1997.

[51] Int. Cl.$^7$ .................................................. A01D 61/00
[52] U.S. Cl. ..................... 56/16.4 R; 56/16.4 A; 56/16.4 B; 56/16.4 C; 56/DIG. 1
[58] Field of Search ................ 56/14.5, 6, 16.4 A, 56/16.4 B, 16.4 C, 14.6, DIG. 1, DIG. 2, 504, 505

[56] References Cited

U.S. PATENT DOCUMENTS

| | | | |
|---|---|---|---|
| D. 312,718 | 12/1990 | McIlwain | D34/29 |
| 3,545,186 | 12/1970 | Glass | 56/14.5 |
| 3,656,284 | 4/1972 | Meek et al. | 56/14.5 |
| 3,712,034 | 1/1973 | Pracca | 56/16.4 C |
| 3,732,670 | 5/1973 | Milliken et al. | 56/16.4 C |
| 3,747,310 | 7/1973 | Calder | 56/16.4 A |
| 4,212,142 | 7/1980 | Miner | 56/16.4 C |
| 4,217,746 | 8/1980 | Cicci et al. | 56/192 |
| 4,265,076 | 5/1981 | Krutz | 56/14.4 |
| 4,332,125 | 6/1982 | Holdren | 56/1 |
| 4,426,926 | 1/1984 | Soteropulos et al. | 100/88 |
| 4,445,313 | 5/1984 | Elliott et al. | 56/16.4 |
| 4,637,201 | 1/1987 | Pruitt et al. | 56/14.5 |
| 4,747,260 | 5/1988 | Petrasch et al. | 56/14.5 |
| 4,850,183 | 7/1989 | Fox | 56/16.4 A |
| 4,862,681 | 9/1989 | Linde et al. | 56/16.4 |
| 4,912,914 | 4/1990 | Wingard | 56/16.4 B |
| 5,022,219 | 6/1991 | Knurr et al. | 56/16.4 R |
| 5,036,652 | 8/1991 | Schmittbetz et al. | 56/16.4 R |
| 5,142,848 | 9/1992 | Seymour | 56/16.4 B |
| 5,152,127 | 10/1992 | Koegel et al. | 56/14.1 |
| 5,269,124 | 12/1993 | Barthel et al. | 56/16.4 B |
| 5,326,319 | 7/1994 | Von Allworden et al. | 56/16.4 B |
| 5,327,709 | 7/1994 | Webb | 56/15.8 |
| 5,396,755 | 3/1995 | Arnold | 56/16.4 B |
| 5,498,207 | 3/1996 | Cappon et al. | 56/16.4 B |
| 5,722,222 | 8/1996 | Walters et al. | 56/16.4 B |
| 5,894,716 | 4/1999 | Haldeman et al. | 56/14.5 |

FOREIGN PATENT DOCUMENTS

| | | | |
|---|---|---|---|
| 0415380 | 3/1991 | European Pat. Off. | |
| 0533666 | 4/1993 | European Pat. Off. | |
| 2162035A | 1/1986 | United Kingdom | 56/16.4 R |

*Primary Examiner*—Thomas B. Will
*Assistant Examiner*—Arpad Fabian Kovacs
*Attorney, Agent, or Firm*—Frank A. Seemar; Larry W. Miller; J. William Stader

[57] ABSTRACT

Self propelled harvesting apparatus is disclosed for processing plant material. The apparatus comprises a pair of cylindrical crushing rolls for crushing plant material and a rotor with radial fins operably associated with the rolls for impacting the crushed plant material. A hood is associated with the impact rotor for redirecting impacted plant material back to the rotor for reimpacting the plant material and to provide severely conditioned plant material. A press assembly presses the severely conditioned plant material and subsequently discharges a cohesive mat of compressed plant material from the harvesting apparatus onto the stubble in the field over which the apparatus is being operated.

4 Claims, 7 Drawing Sheets

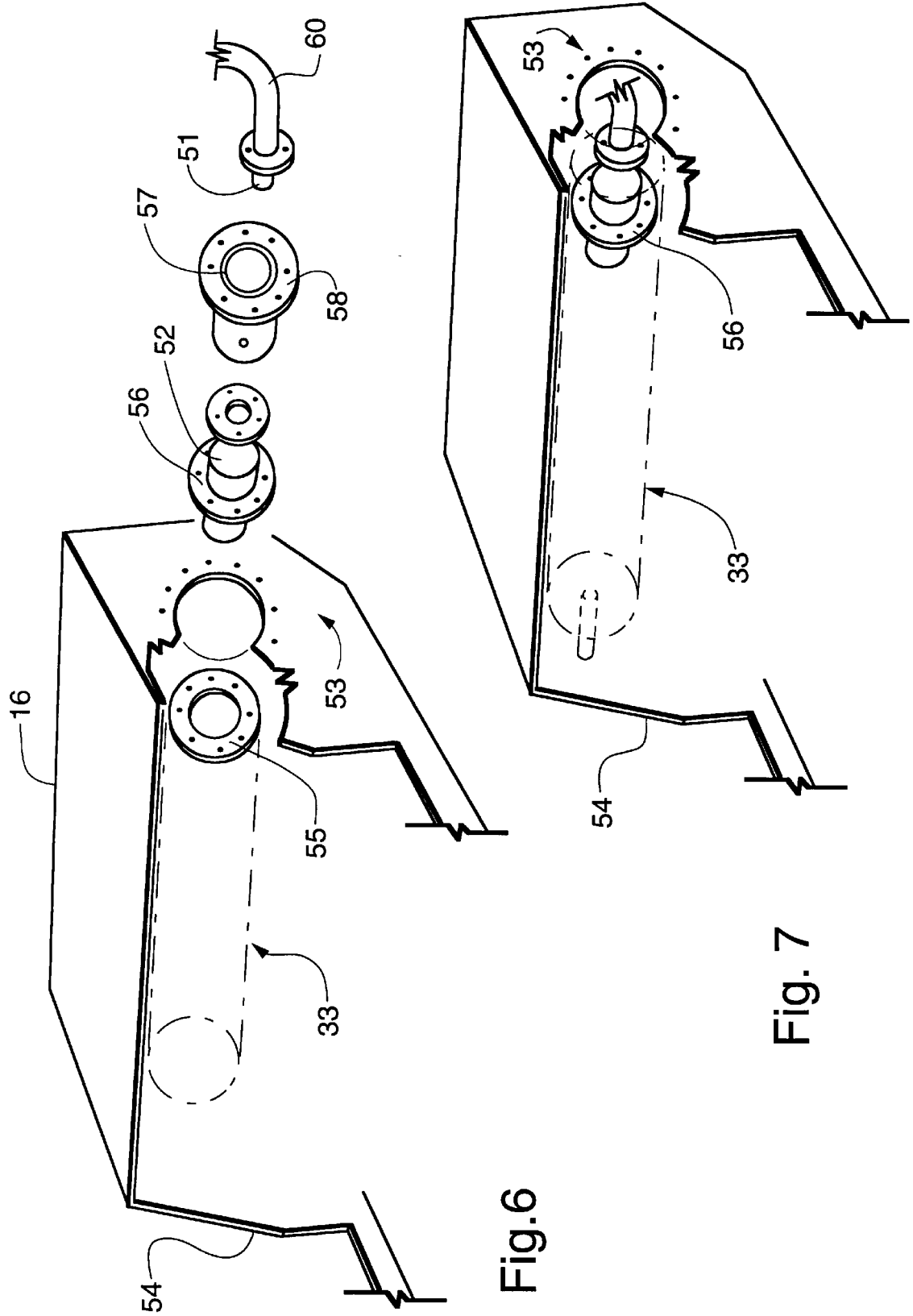

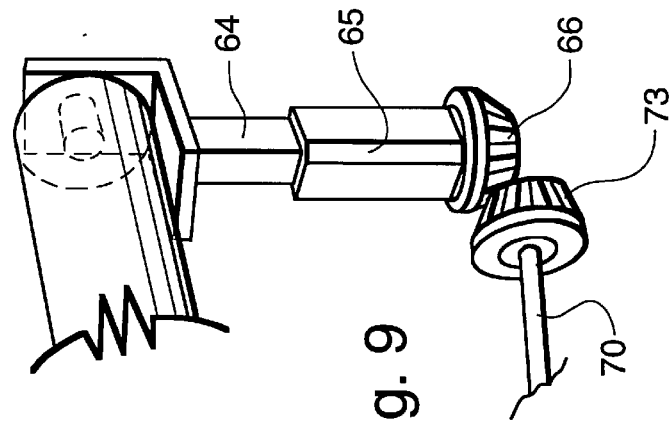
Fig. 9
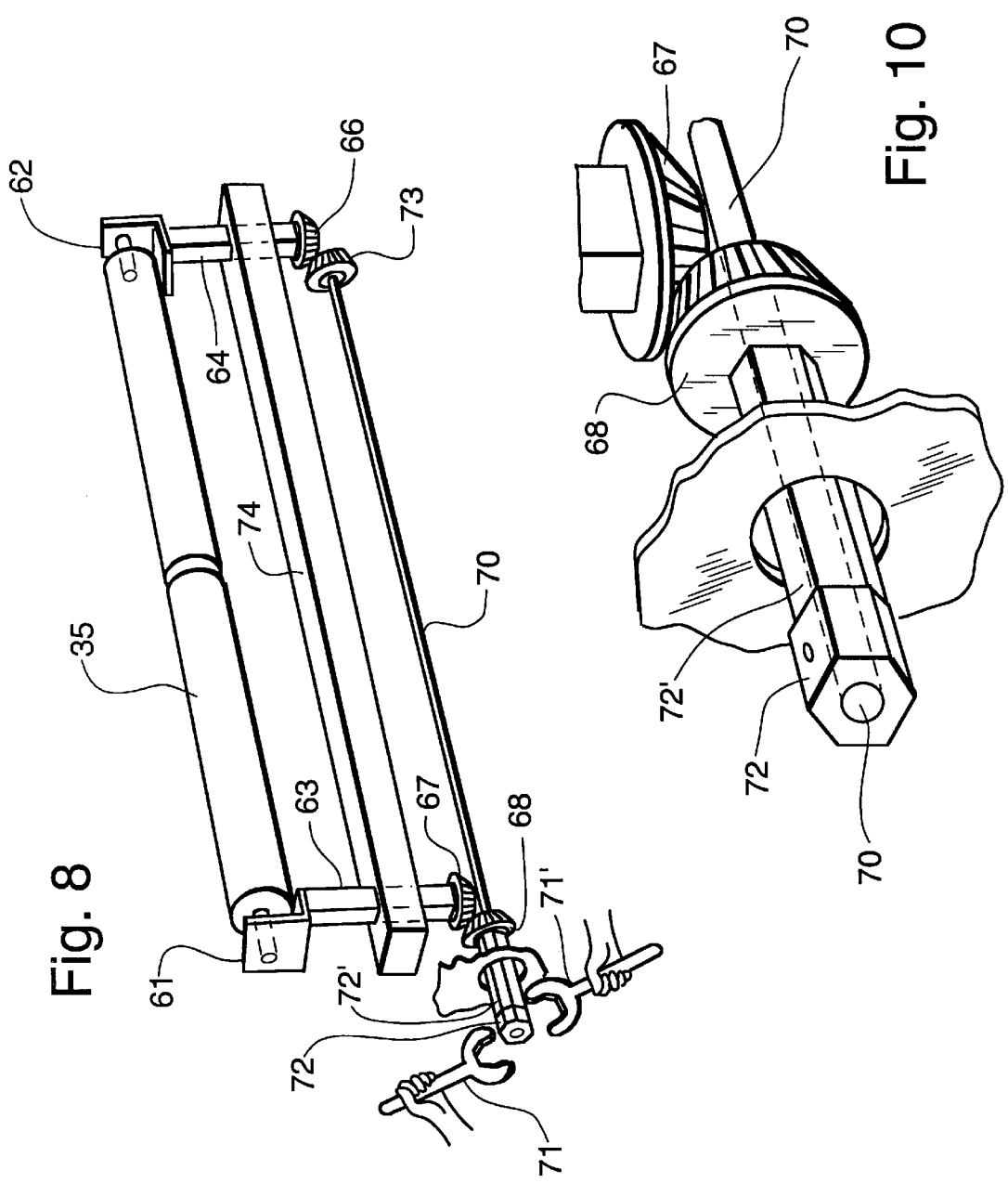
Fig. 8
Fig. 10

APPARATUS FOR TREATING PLANT MATERIAL

CROSS REFERENCE TO RELATED APPLICATION

This application claims the benefit of U.S. Provisional Application No. 60/054,653, filed Aug. 4, 1997, and entitled Apparatus for Pressing Macerated Crop Material.

FIELD OF THE INVENTION

The present invention relates generally to apparatus and method for treating plant material and more particularly self propelled harvesting apparatus and an associated method for severely conditioning and compressing plant material to form a mat of macerated material.

BACKGROUND OF THE INVENTION

During the process of producing and harvesting hay it is common to condition stalky plant material such as alfalfa, clover, or the like, by crushing or crimping the stems. This cracks the stems and thereby reduces the time cut plant material remains in the field by increasing the rate at which moisture escapes. U.S. Pat. No. 4,445,313, issued May 1, 1984 in the name of Thomas Elliott et al, discloses a machine illustrative of the general principle of conditioning by crimping. Another example of prior art showing conditioning by crimping is U.S. Pat. No. 4,862,681, issued Sep. 5, 1989 in the name of Gilbert W. Linde et al, which discloses conditioning rolls that crimp and also reciprocate relative to each other to enhance the conditioning.

In addition to crushing or crimping, it is also well known that plant drying can be further enhanced by subjecting the crushed plants to additional conditioning that causes the plant stems to be severely crushed and/or fiberized. This very severe conditioning is commonly referred to as maceration. The various levels of conditioning to which plant materials are subjected has a direct affect on the drying rate. Another benefit of severe conditioning, i.e., maceration, is that it enhances the digestibility of dry hay and hay silage. Maceration is also carried out as a precursor to juice expression from herbage, where industrially valuable products, such as enzymes or nutritional substances are then extracted from the plant juice.

An example of prior art apparatus for macerating plant material, such as forage crops, is shown in U.S. Pat. No. 4,265,076, issued May 5, 1981 in the name of Gary W. Krutz, wherein a self propelled implement is disclosed. The crop material is macerated by a pair of opposing crushing rolls having differential peripheral speeds, after which it is conveyed to a press to form a mat that is discharged rearwardly onto the field over which the implement is being operated.

Another example of prior art apparatus for macerating plant material, also referred to as herbage, is shown in U.S. Pat. No. 5,152,127, issued on Oct. 2, 1992 in the name of Richard G. Koegel et al ("'127 patent"). This patent, hereby incorporated by reference in its entirety, provides an extensive explanation of background material relating to severe conditioning. The '127 patent discloses an implement for processing herbage, such as forage crop material, by cutting standing crop, feeding the cut crop material to a pair of crushing rollers to initially crack the stems of the plants, and subsequently impacting the crushed forage crop material to provide additional fiberization.

In pending application Ser. No. 08/884,277, filed Jun. 27, 1997 in the name of Richard G. Koegel, et al, macerating apparatus is shown that is similar to the apparatus in the '127 patent. The apparatus comprises crushing rolls, an impact rotor and a deflection hood assembly for redirecting impacted crop material back to the impacting rotor for reimpaction.

It should be noted that, although not shown in the drawings of the '127 patent, reference is made to prior art presses for forming mats from macerated material. Insofar as pressing is concerned, a self propelled implement for macerating plant material, such as forage crops, is shown in U.S. Pat. No. 4,265,076, issued May 5, 1981 in the name of Gary W. Krutz, wherein apparatus is disclosed for pressing the macerated plant material. In this implement the crop material is macerated by a pair of opposing crushing rolls with differential peripheral speeds, after which it is conveyed to a press to further enhance drying. The press comprises a roller and a conveyor belt that forms a mat of macerated material that is discharged rearwardly onto the field over which the implement is being operated.

In U.S. Pat. No. 4,332,125, issued Jun. 1, 1982 in the name of Richard D. Holden, harvesting apparatus is disclosed for macerating plant material and subsequently compressing the macerated material to form a mat that is deposited onto the stubble of the freshly cut stems. In this apparatus the mat is formed by exerting pressure in the nip formed between a belt and a series of cooperating rollers arranged with decreasing diameters.

EPC Patent Application No. EP 0,415,380, filed Aug. 29, 1990 in the name of S. Schuster shows a press for macerated material in which the crop is compressed to a mat between opposing belts that follow a generally S-shaped path. In another EPC Patent Application, No.EP 0,053,666, filed Oct. 1, 1992 in the name of Klockener-Humbolt-Deutz, a press is shown for macerated material being conveyed along a path between a central roller and a series of planetary rollers with smaller diameters.

In summary, it is acknowledged that the crushing-impact forage conditioner of the type shown in the '127 patent is in the forefront of technology for treating plant material to improve drying rates and digestibility. The high speed impact rotor directly behind the crushing rolls conditions crop by first crushing the tubular structure of plant material by first crushing the stems with the crushing rolls and then fiberizing the crushed stems via the impact rotor. The stems are fiberized along the longitudinal splits that are created during crushing. The degree of conditioning can be altered by varying the force applied by the crushing rolls and the speed and position of the impact rotor. Crop severely conditioned in this manner cannot be simply laid back on the stubble without incurring significant losses. To prevent such loss the severely conditioned crop is pressed into a cohesive mat and deposited on the stubble for support during drying. Its cohesiveness enhances its ability to span gaps in the stubble permitting it to dry completely, and reduce losses during subsequent harvesting.

SUMMARY OF THE INVENTION

An important object of the present invention is to provide improved apparatus and method for treating plant material to enhance drying rates and digestibility.

Another important object of the present invention is to provide an improved method and apparatus for pressing severely conditioned plant material.

In pursuance of the above and other important objects the present invention contemplates self propelled harvesting apparatus for processing plant material comprising in combination rotatable means for crushing plant material, impacting means operably associated with the rotatable means for impacting the crushed plant material, means operably associated with the impacting means for directing the impacted plant material back to the impacting means for reimpacting the plant material to provide severely conditioned plant material, means for pressing the severely conditioned plant material to form a mat, and means for discharging the mat of compressed plant material from the self propelled harvesting apparatus.

The invention also contemplates a method for treating plant material comprising the steps of forming crushed plant material by passing the plant material between a pair of closely aligned crushing means, macerating the crushed plant material by guiding it into the path of impacting means immediately after it has been crushed, macerating the macerated material by reimpacting the macerated material, and pressing the reimpacted macerated material into a mat to enhance drying and minimize field losses.

The invention further contemplates harvesting apparatus of the type set forth above wherein the pressing means comprise an upper belt having a plant engaging surface traveling in a predetermined path, a lower belt having a plant engaging surface traveling in a predetermined path adjacent the upper belt to receive and convey the severely conditioned plant material, and a series of rolls selectively arranged to engage the upper and lower belts to provide a path through which the crop material is conveyed.

Still further, the present invention comprises harvesting apparatus of the type set forth above wherein the plant engaging surface of the upper belt is provided with a pattern of protrusions that minimizes loss of nutrients when the severely conditioned plant material is discharged.

Yet further, the present invention comprises apparatus as generally set forth above wherein the plant engaging surface of the lower belt is more aggressive than the plant engaging surface of the upper belt.

The foregoing features described and referred to above, along with other objects, features and advantages of the invention will appear more fully hereinafter from a consideration of the detailed description which follows, in conjunction with the accompanying sheets of drawings wherein the principal embodiment of the invention is illustrated by way of example. It is to be expressly understood, however, that the drawings are for illustrative purposes and are not to be construed as defining the limits of the invention.

DESCRIPTION OF THE DRAWINGS

FIGS. 6 and 7 are diagrammatical views showing key elements of the embodiment shown in FIG. 3.

FIGS. 8, 9 and 10 are diagrammatical views of certain elements of the apparatus in which the present invention is incorporated.

DESCRIPTION OF THE INVENTION

Figure 1:
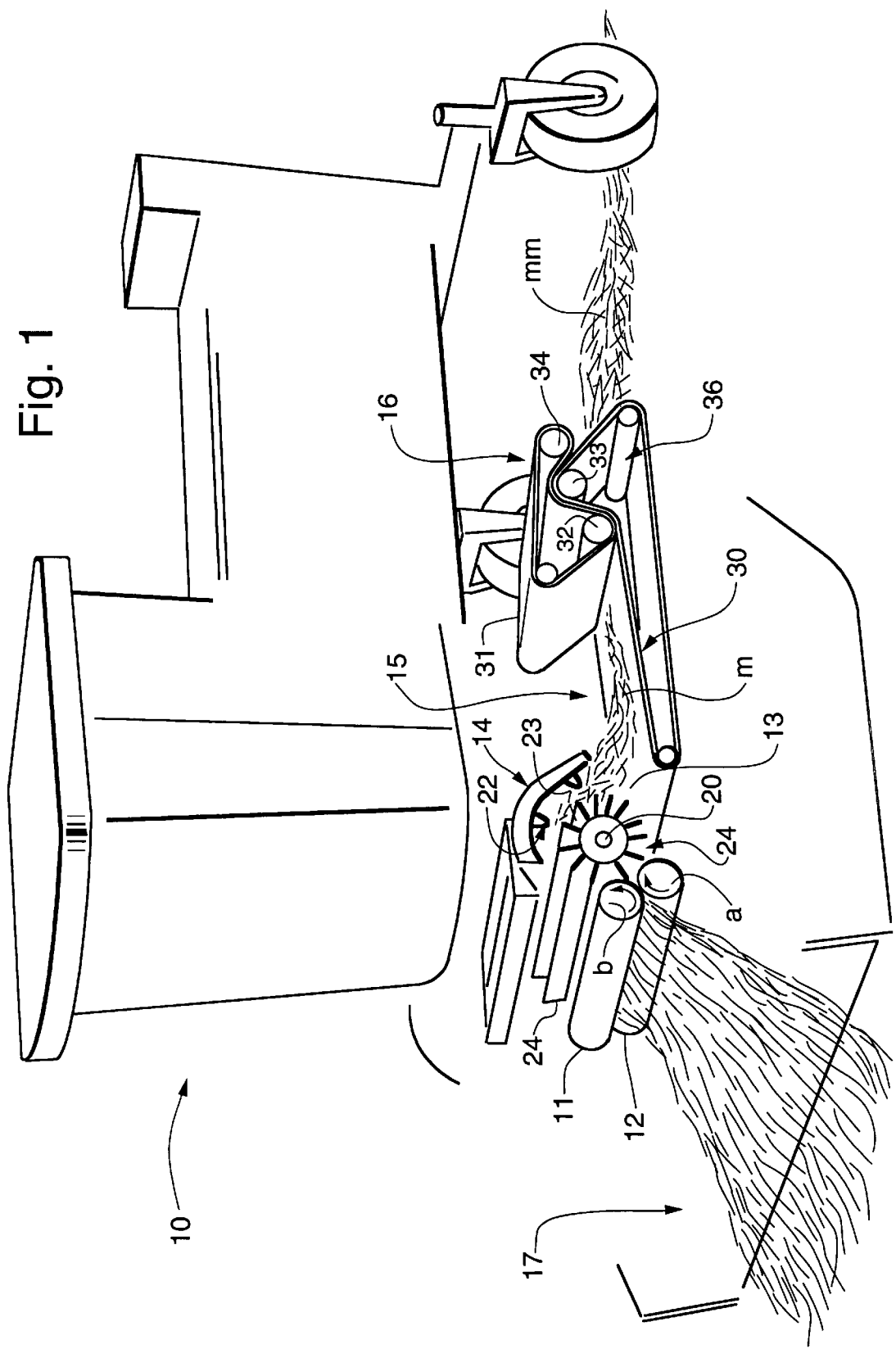
FIG. 1 is a diagrammatical perspective view of self propelled harvesting apparatus in which the principal embodiment of the present invention is incorporated.

Referring now to the drawings for a more detailed description of the present invention, FIG. 1 diagrammatically shows a self propelled harvester, designated by reference numeral 10, in which the present invention may be readily incorporated. In the harvester depicted, counter rotating crushing rolls 11, 12 receive plant material and feed it rearwardly to impact rotor 13, which impacts the crushed plant material and redirects it rearwardly. The speed of impact rotor 13 is greater than crushing rolls 11, 12, to impact the material and take it away as it is thrust upwardly and rearwardly in the direction of hood 14. The crushed and impacted material is then deposited on a conveying assembly 15, where it is conveyed to a press assembly 16 employed rearwardly of the deflector hood. The material is pressed into a thin mat and subsequently deposited on the field, where stubble from recently cut crops supports it in a position slightly elevated above the surface of the ground, thereby permitting air flow above as well as below the mat.

Self propelled harvester 10 includes a forwardly extending header, generally referred to by reference numeral 17, suspended from a frame in a conventional manner. The header, not shown in detail, would commonly include a forwardly positioned transverse cutterbar disposed in close proximity to the ground to sever standing crops, a reel for engaging the severed plant material and conveying it rearwardly, and a transverse auger that consolidates the rearwardly conveyed plant material and discharges it through an opening in the header to rolls 11, 12. The structure and function of header 17 is well known in the art, an example of which is shown and described in U.S. Pat. No. 5,327,709, issued Jul. 12, 1994 in the name of Bryant Webb, hereby incorporated by reference.

Figure 2:
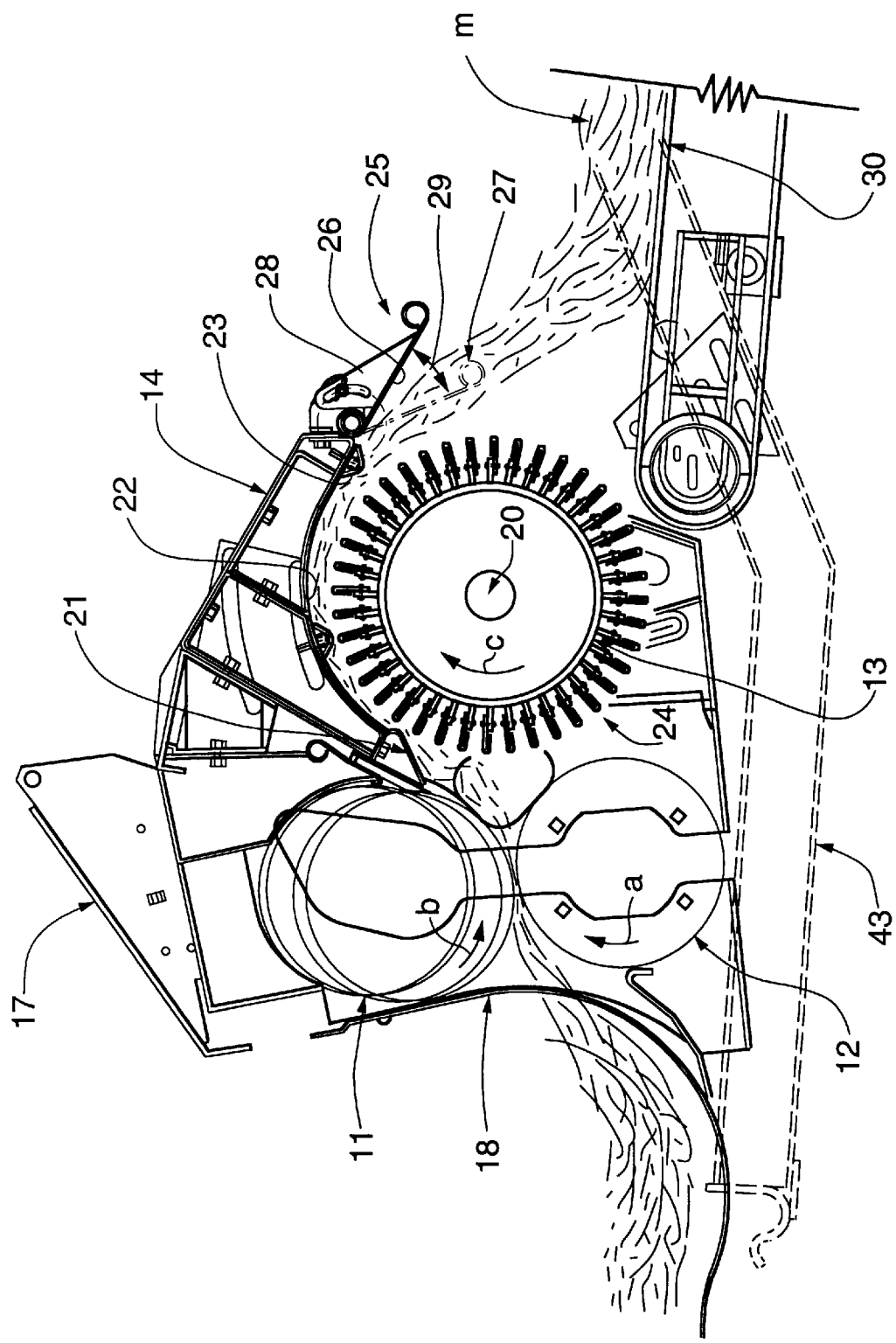
FIG. 2 is a diagrammatical elevational view illustrating various elements of the apparatus shown in FIG. 1.

In the macerator depicted in FIG. 1 and shown in further detail in FIG. 2, crushing rolls 11, 12 are rotatably mounted on header 17 behind wall 18 in general alignment with the transverse consolidating auger (not shown) of header 17. The rotational direction of crushing rolls 11, 12 is illustrated by directional arrows a and b in FIGS. 1 and 2. Crushing rolls 11, 12 are journalled in bearing assemblies mounted on sides walls of header 17 and driven by conventional means, such as chains, belts, gears, hydraulics, or a combination thereof. To accommodate varying thicknesses of plant material being crushed, rolls 11, 12 can be spaced and/or spring loaded toward each other in a conventional manner, as illustrated by the multiplicity of positions of roll 11 depicted in FIG. 2. The outer surfaces of crushing rolls 11, 12 are aggressive to improve feeding characteristics.

Impact rotor 13, also mounted on header 17, is similarly journalled in opposing bearing assemblies mounted on the header side walls. Conventional drive means rotate impact rotor 13 in the direction of arrow c, i.e., in a clockwise direction when viewed from the left side of the apparatus shown in FIG. 2, about transverse axis 20. The position of axis 20 is adjustable vertically and horizontally to modify the spacing and vertical relationship between crushing rolls 11, 12, and impact rotor 13, as well as deflector hood assembly 14 and impact rotor 13.

Deflector hood assembly 14, also mounted between the side walls, comprises an inwardly facing arcuate surface to which a plurality of guide elements 21, 22, 23 are secured. More specifically, guide element 21 is triangularly shaped in cross section with a flat impact surface in the downstream path of plant material that has been crushed by rolls 11, 12, impacted by rotor 13, and then impelled in a general upward direction. Element 21 extends from side to side with its rear portion terminating in the vicinity of the cylindrical path of the tips of a plurality of radially extending impact elements 24 of rotor 13. Guide elements 22, 23, similar in configuration to each other, are angularly shaped and selectively attached along the surface of hood assembly 14. Rearmost element 23 may be radially adjustable relative to the cylindrical path of the tips of impact elements 24.

An auxiliary hood 25 comprises a flat inwardly facing deflection element 26 pivotally mounted to deflector hood assembly 14 by a pivot assembly for adjustment between an inner position 27 shown in phantom outline, and an outer position shown in solid lines. Deflection element 26 includes generally triangular ribs 28 secured to the pivot assembly for varying the position of auxiliary hood 25. The surface of deflector element 26 is continuous from side to side with its forward edge contiguous with the rearward edge of the inwardly facing surface of hood assembly 14. By varying the position of auxiliary hood 25 inwardly, as illustrated by arrow 29, the discharge path of processed plant material can be selectively positioned to a more forward position on a lower belt 30, generally shown in FIG. 1 and partly shown in FIG. 2. Lower belt 30 is operatively mounted downstream from impact rotor 13 for conveying processed crop rearwardly to press assembly 16 in a uniform manner regardless of crop quantity and density. (This lower belt will be frequently referred to hereinbelow in the description of the press assembly) Thus, by selectively positioning auxiliary hood 25 the harvesting apparatus can be preadjusted for optimal operating conditions.

As mentioned above, macerating apparatus comprising crushing rolls, impact rotor, and deflector hood assembly of the type described above is disclosed in pending application U.S. Ser. No. 08/884,277, filed Jun. 27, 1997, hereby incorporated by reference.

Figure 3:
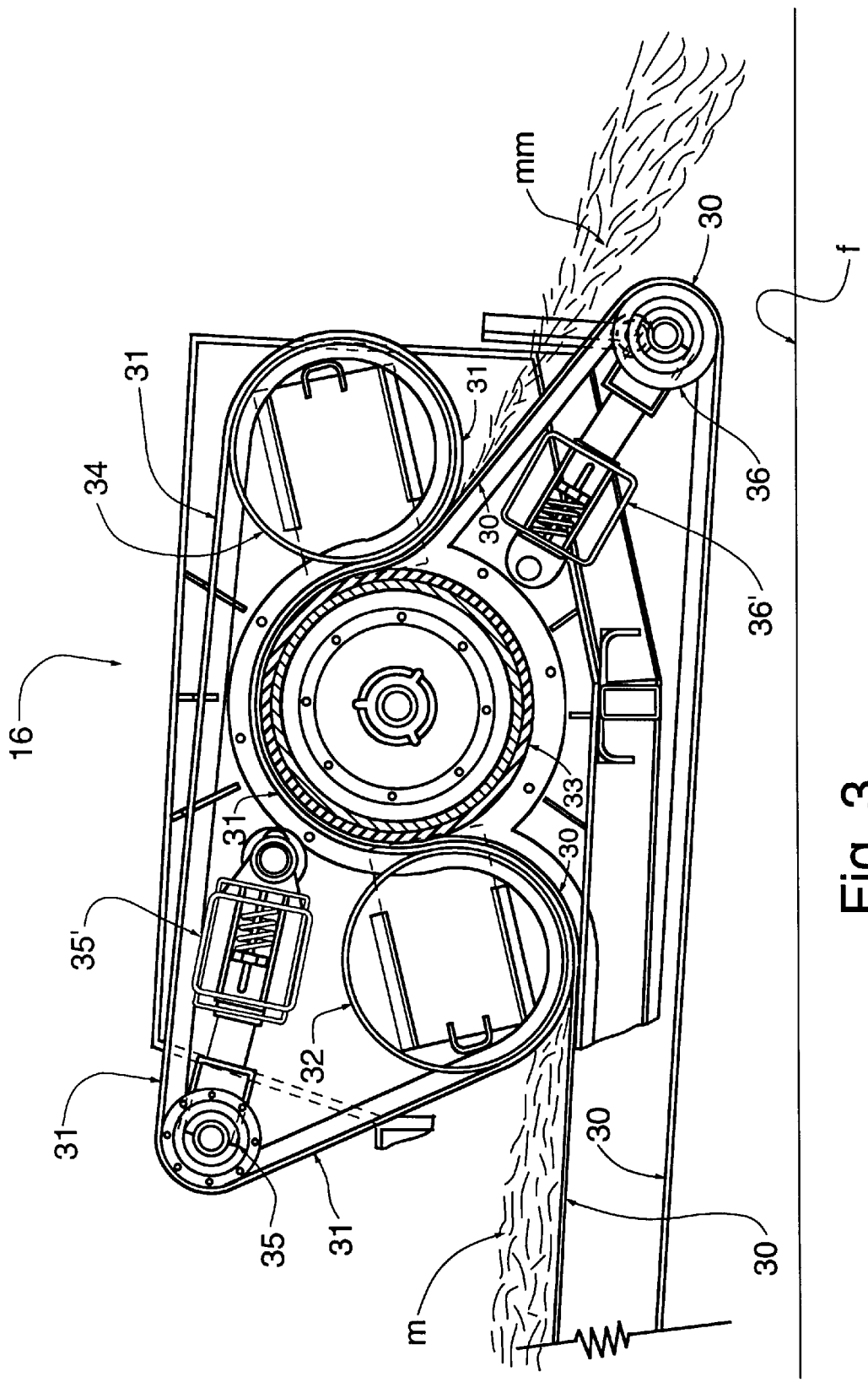
FIG. 3 is a diagrammatical elevational view of one embodiment of the press assembly of the present invention.

Now turning to FIG. 3, press assembly 16 includes an upper belt 31 and lower belt 30, both of which are trained in a generally S-shaped path around aligned pressing rolls 32, 33, 34. Roll 33 is driven, and is rubber covered to provide what is commonly referred to as a greater "foot print" between the belts at the nip points. This increases the time the material is held between the rolls under high pressure conditions. Additionally, the use of rubber roll surfaces increase the coefficient of friction between the roll surface and the lower belt. Rolls 32, 34 are urged toward the driven roll to press macerated crop m as it enters the nip between upper belt 31 and lower belt 30. Pressing takes place as the material is urged rearwardly along a path having a general S-shaped configuration. The S-shaped path is formed between driven roll 33 and adjacent press rolls 32, 34. As the material is transported between the belts along this path, it encounters two pinch points, or nips, at diametrically opposing locations between the outer surfaces of adjacent rolls. The first pinch point is defined by rolls 32 and 33, and the second pinch point is defined by rolls 33 and 31. The belts constrain the material between the pinch points and thereby prevent the pressed material from reexpanding between successive nips. The material is discharged as a mat mm and conveyed along lower belt 30 to be finally deposited rearwardly on the surface of field f, over which the harvester is being operated. An upper idler roll 35 is urged outwardly by the rod of cylinder 35', to maintain upper belt 31 under tension. Likewise, a lower idler roll 36 is urged outwardly to maintain lower belt 30 under tension.

Various belt surfaces can be utilized to engage the mat of pressed material, with prime importance being the ability of the belts to press the material into a mat and then readily release the mat. One means of improving release is to wrap the belt around a roller having a relatively small diameter, such as roller 36. As the belt is flexed around roll 36, the belt surface stretches and creates a shearing action between the mat and the belt surface. This shearing action allows the mat of macerated plant material to release from the belt and maintain its integrity.

This invention also contemplates the use of a textured belt, such as a common diamond shaped configuration of protrusions on the outer surface of the belt. This provides pockets for moisture to reside during pressing, while enabling the moisture to be reabsorbed into mat mm as it being discharged to minimize lose of nutrients.

Various functions are facilitated by the use of a textured belt surface. A textured belt reduces contact area between mat and belt. This minimizes adhesion forces between the mat and belt which thereby improves mat release from the belt. Also, a textured belt provides void spaces for water when the material is under pressure. This allows the plant material to be compressed to a higher density which improves mat strength. Water (or juice) expressed is absorbed by the plant material when pressure is released. Further, a textured belt prevents plant material from sliding on the belt after it is discharged from the impact rotor. This improves feeding as the material on belt 30 is engaged by belt 31, as well as when the mat is subsequently fed into the nips, all of which helps minimize bunches or thick spots in the mat being formed and results in a more uniform thickness of mat mm.

In operation, the apparatus shown in FIGS. 1–3 provides for crushing, impaction, reimpaction and pressing of plant material being processed. The invention contemplates in general an impaction assembly mounted downstream from a crushing assembly and a pressing assembly downstream from the impaction assembly. Material crushed by the crushing assembly is thrust against the fins of impact rotor 13, which is rotating at a relatively high rate of speed. For example, with the crushing rolls rotating at 800 RPM, a typical speed for the impact rotor would be in a range of 1000 RPM to 3000 RPM, depending on the level of conditioning desired and type and maturity of the crop being processed. The crushed material is macerated by the impact of the fins and deflected by the deflection elements on hood assembly 14 one or more times back to the impact rotor. During this process the treated material is guided by the hood along a generally circumferential path to a conveyor assembly, where it is conveyed rearwardly by lower belt 30, and subsequently engaged by pressing assembly 16 and pressed into a mat prior to being deposited on the field, as discussed above.

Figure 4:
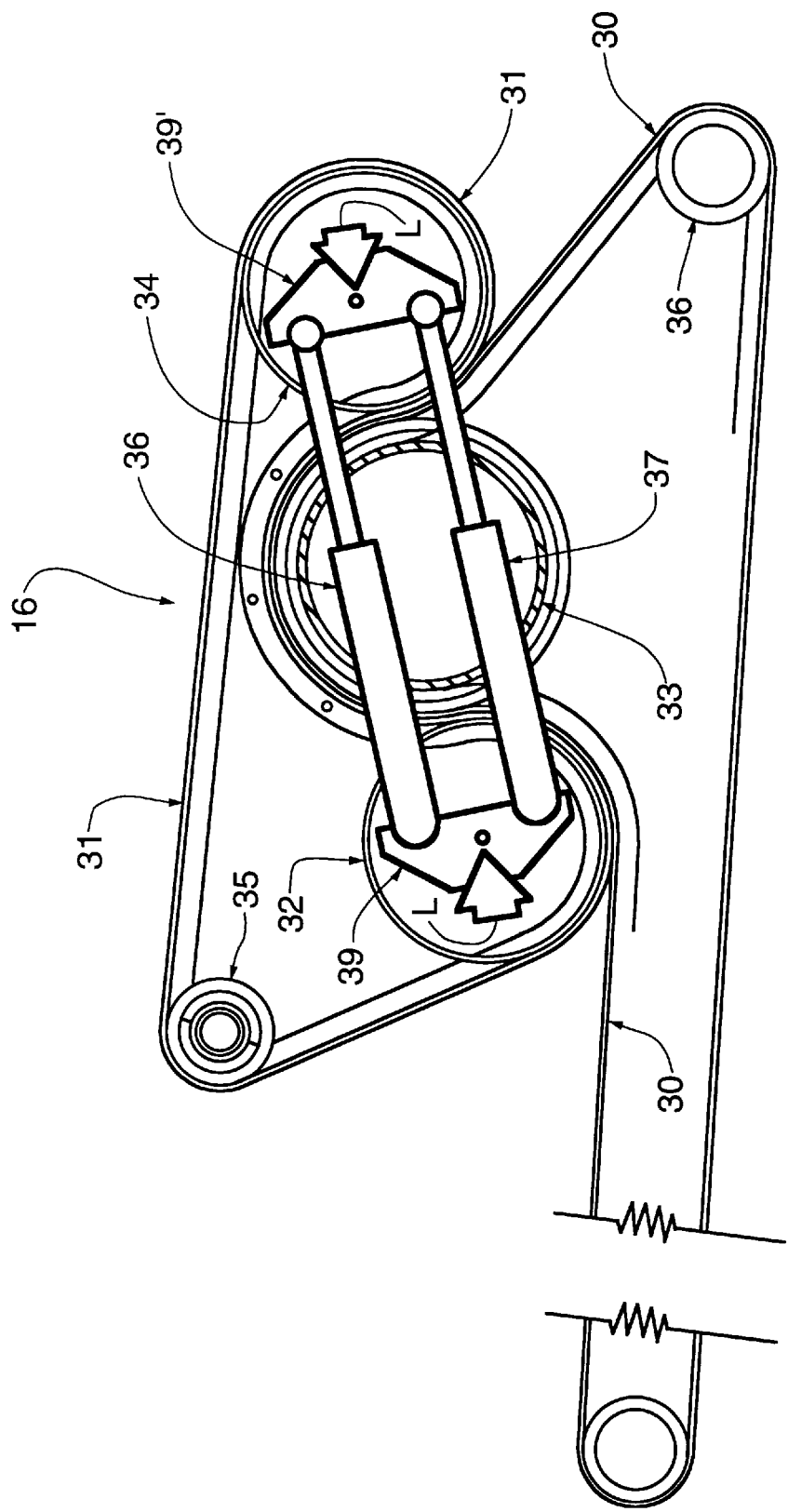
FIG. 4 is a diagrammatical elevational view showing key elements of the embodiment shown in FIG. 3.

In FIG. 4 a balanced force mechanism is shown that is applicable to belt pressing assembly 16 of FIG. 3. More particularly, the balanced force mechanism of FIG. 4 is an enhancement of the above discussed belt press defined by aligned rolls 32, 33, 34, upper belt 31 and lower belt 30. Rolls 32, 34 are drawn toward each other by two pairs (only one pair shown) of hydraulic cylinders 37, 38 resulting in a balanced load L applied via the axes of rolls 32, 34 to the opposing sides of driven roll 33. Intermediate members 39, 39', pivotally mounted on the shafts along the axes of rolls 32, 34, are utilized to transfer the force from the cylinders to apply load L. Alternatively, the load could be applied by tension springs. In this mechanism (springs or cylinders) a balanced force is developed between the rolls without transferring any force into the external framework of the press assembly. This minimizes weight, cost and complexity of the press assembly. Further, this configuration applies such diametrically balanced force to each side of the drive roll thus preventing deflection along its axis.

Mechanical stops (not shown) are provided to provide a limit to the position of rolls 32 and 34 under conditions where material is not contained in the press. Thus, rolls 32 and 34 will not be urged far enough toward the drive roll to rotate, which conserves energy during such time as the press is not receiving material. The stops also serve to reduce wear on the drive roll and belts.

By varying the hydraulic pressure in cylinders 37 and 38 (or spring tension) the force applied to the material in the press can be varied to accommodate different types of material and yield mats of different thicknesses and/or densities. It should be noted that moisture content of the material is not reduced by pressing, i.e., all the juice that is expressed during pressing is absorbed back into the plant material before it is deposited onto the stubble.

Figure 5:
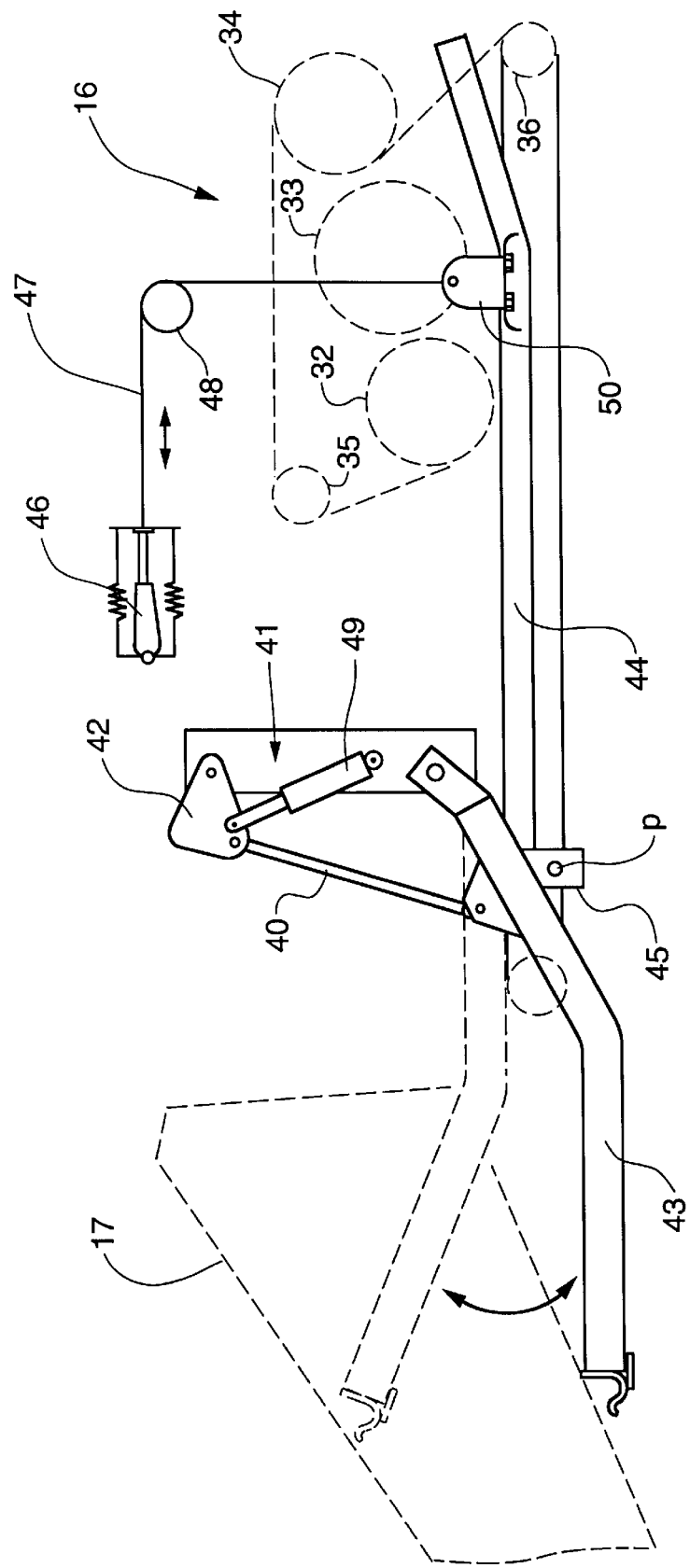
FIG. 5 is a diagrammatical elevational view of certain elements of the apparatus in which the present invention is incorporated.

Now turning to FIG. 5, the press assembly is shown in diagrammatic form in relation to header 17, illustrated in phantom outline. A standard lift arrangement for the header includes a lift link 40 coupled to frame 41 via an intermediate pivotally mounted element 42, which is hydraulically driven by cylinder 59 to lift header 17 to the transport position via lift arm 43. Thus, by extending the rod of cylinder 49, lift arm (pivotally mounted on frame 41) will lift header 17 to the raised position shown in phantom outline. The front of the press assembly is also attached to lift arm 43, via a pin p coupled to press frame 44 and extending through bracket 45, which is affixed to arm 43. A similar arrangement is utilized on the opposite side. Thus, the front of the press assembly 16 is lifted conjointly with header 17. At the same time the rear of the press assembly is lifted by hydraulic cylinder 46 via a cable 47 trained about pulley 48 at one end and secured to bracket 50 at the other end. Lifting is accomplished by a simple and low cost arrangement that raises the front of press assembly 16 to a transport position by utilizing existing header structure, without changing the relationship of the front of the assembly with respect to the impact rotor mounted in the header. This relationship is clearly depicted in FIG. 2, where lift arm 43, shown in phantom, is in the lower position, i.e., solid lines in FIG. 5. It should also be mentioned that the press lift is spring loaded to allow the press to float along ground contour.

The press assembly is readily detachable from the header by releasing pins p from brackets 45. Thus, an operator may choose to condition a crop and deposit it directly onto the stubble without forming a mat. This practice would be most common in grass type crops.

Referring now to FIGS. 6 and 7 a unique arrangement for driving drive roll 33 of press assembly 16 is shown. To maximize width of the rolls in the press assembly within the constraints of the overall harvesting apparatus in which it is utilized, the roll drive train is located internal to the roll being driven. Hydraulic motor 51 and associated planetary gear reduction assembly 52 are attached to enclosure 57 which is cantilevered from the side 53 of the press assembly frame.

More particularly, roll 33, extending laterally between the interior surfaces of sides 53, 54, is journalled for rotation on the right side in a conventional manner. On the left side internal disc 55, secured to the inside of roll 33, is attached to a similar disc 56 driven by planetary gear reduction assembly 52, which is mounted to enclosure 57 that in turn is secured to side 53 by its ring shaped flange portion 58. Hydraulic motor 51 is secured within enclosure 57 and drives planetary gear reduction assembly 52. The exploded view in FIG. 6 shows hydraulic hose 60 terminating in motor 51 which is attached to planetary assembly 52 mounted within roll 33. This is shown in FIG. 7 for illustrative purposes without enclosure 57, the latter of which is only shown in FIG. 6.

For effective operation of press assembly 16 the belts must be maintained at proper tension. This is accomplished by adjusting the axial position of idler rolls 35, 36, by adjusting lead screws mechanisms 35', 36' to preset initial tension. FIGS. 8–10 show an alternative system for accurately adjusting the idler rolls during operation. Roll 35, for example, is journalled for rotation in bearing assemblies mounted in brackets 61, 62 attached to and moveable with slide brackets 63, 64. A traveling nut affixed to slide bracket 64 travels along screw 65, see FIG. 9, which is attached to bevel gear 66. A similar bevel gear 67, coupled to bevel gear 68 via shaft 70, operates a traveling nut assembly within slider bracket 63 on the other end of the roller. To adjust one end of roll 35 a wrench 71' (see FIG. 8) is used to turn hex element 72', which rotates bevel gear 68 which in turn rotates bevel gear 67 and its associated traveling nut. To adjust the other end of roll 35 a wrench 71 (also see FIG. 8) is used to turn hex element 72, pinned to shaft 70, which rotates bevel gear 73 which in turn rotates bevel gear 66 and its associated traveling nut. If desired both hex elements can be turned together to move both ends of shaft 35 in concert. Thus, based on the direction of rotation, moving roll 35 is move either toward or away from frame member 74 to selectively increase or decrease belt tension during operation of the press.

Of the many implicit and explicit advantages of the present invention one of the most important is the provision of pressing apparatus that allows the extent of maceration of plant material to be selected within a wide range. This extends the application of the maceration apparatus from moderate conditioning for accelerated field drying to very severe maceration where it is desired to express juice from the herbage as a source of value added products. Examples of potentially significant valuable value added products are livestock and/or food-grade protein concentrates, pigmenting agents for the poultry industry, and industrially valuable enzymes.

While preferred structure in which the principles and features of the present invention are shown and described above, it is to be understood that the invention is not limited to such preferred structure, but that, in fact, widely different means of varying scope and configuration may be employed in the practice of the invention. Further, while the unique apparatus of the present invention discussed above, in some instances, is described as being adaptable to handle forage crop material, it is not intended that it be limited to that type of herbage.

Having thus described the invention, what is claimed is:

1. Self propelled harvesting apparatus for processing plant material comprising in combination rotatable means for crushing plant material, impacting means operably associated with said rotatable means for impacting said crushed plant material, means operably associated with said impacting means for directing the impacted plant material back to said impacting means for reimpacting said plant material to provide severely conditioned plant material, means for pressing said severely conditioned plant material to form a mat, said means for pressing comprise an upper belt having a plant engaging surface traveling along a predetermined path, a lower belt having a plant engaging surface traveling along a second predetermined path adjacent said upper belt to receive and convey said severely conditioned plant material, and a series of rolls selectively arranged to engage said upper and lower belts to provide a path through which said plant material is conveyed, said rolls rotate about spaced parallel shafts, said series of rolls include three generally aligned pressing rolls between which said upper and lower belts are trained to define said path in a generally S-shaped configuration, the shafts of said three pressing rolls having parallel axes residing in a common plane, said means for compressing further comprising coupling means between the outer two rolls, said coupling means comprising means for applying a balanced load to the opposing sides of the center roll by urging the shafts of said outer two rolls toward each other along said common plane, and means for discharging said mat of compressed plant material from said self propelled harvesting apparatus.

2. In harvesting apparatus as set forth in claim 1 wherein said coupling means further comprise at least one hydraulic cylinder coupled between each of the adjacent ends of said shafts of said outer two rolls for urging said rolls toward said center roll.

3. Self propelled harvesting apparatus for processing plant material comprising in combination rotatable means for crushing plant material, impacting means operably associated with said rotatable means for impacting said crushed plant material, means for reimpacting said plant material to provide severely conditioned plant material, means for pressing said severely conditioned plant material to form a mat, said means for pressing comprise an upper belt having a plant engaging surface traveling along a predetermined path, a lower belt having a plant engaging surface traveling along a second predetermined path adjacent said upper belt to receive and convey said severely conditioned plant material, and a series of rolls selectively arranged to engage said upper and lower belts to provide a path through which said plant material is conveyed, said series of rolls include three generally aligned pressing rolls between which said upper and lower belts are trained to define said path in a generally S-shaped configuration, the shafts of said three pressing rolls having parallel axes residing in a common plane, said means for compressing further comprising coupling means between the outer two rolls, said coupling means comprising means for applying a balanced load to the opposing sides of the center roll by urging the shafts of said outer two rolls toward each other along said common plane, and means for discharging said mat of compressed plant material from said self propelled harvesting apparatus.

4. In harvesting apparatus as set forth in claim 3 wherein said coupling means further comprise at least one hydraulic cylinder coupled between each of the adjacent ends of said shafts of said outer two rolls for urging said rolls toward said center roll.

* * * * *